United States Patent
Szynakiewicz et al.

(10) Patent No.: US 12,448,738 B2
(45) Date of Patent: *Oct. 21, 2025

(54) SYSTEM AND METHOD FOR SUBGRADE STABILIZATION OF RAILROAD BED

(71) Applicant: R & B Leasing, LLC, Grand Junction, CO (US)

(72) Inventors: Tomasz Szynakiewicz, Golden, CO (US); Justin Anderson, Lexington, KY (US); Robert W. Hollinger, Arvada, CO (US)

(73) Assignee: SOIL-NAIL HOLDINGS, LLC, Commerce City, CO (US)

( * ) Notice: Subject to any disclaimer, the term of this patent is extended or adjusted under 35 U.S.C. 154(b) by 911 days.

This patent is subject to a terminal disclaimer.

(21) Appl. No.: 17/402,887

(22) Filed: Aug. 16, 2021

(65) Prior Publication Data

US 2021/0372055 A1 Dec. 2, 2021

Related U.S. Application Data

(63) Continuation of application No. 15/902,888, filed on Feb. 22, 2018, now Pat. No. 11,118,315.

(51) Int. Cl.
*E01B 27/10* (2006.01)
*E01B 1/00* (2006.01)
(Continued)

(52) U.S. Cl.
CPC ............ *E01B 27/102* (2013.01); *E01B 1/001* (2013.01); *E01B 2/006* (2013.01); *E01B 37/00* (2013.01); *E01B 2204/03* (2013.01)

(58) Field of Classification Search
CPC ...... E01B 2204/03; E01B 37/00; E01B 2/006; E01B 1/001; E01B 27/102
(Continued)

(56) References Cited

U.S. PATENT DOCUMENTS 3,020,858 A 2/1962 Perkins et al.
3,286,649 A 11/1966 Hughes
(Continued)

FOREIGN PATENT DOCUMENTS

DE 19623305 A1 * 12/1997 ............ E01B 2/006
JP S60152718 A 8/1985
(Continued)

OTHER PUBLICATIONS

Australian Examination Report dated Feb. 12, 2020 in Australian Application No. 2019201223, 8 pages.
(Continued)

*Primary Examiner* — S. Joseph Morano
*Assistant Examiner* — Heaven R Buffington
(74) *Attorney, Agent, or Firm* — Berg Hill Greenleaf Ruscitti LLP

(57) ABSTRACT

The invention is a system and method for repairing, improving, and stabilizing subgrade and subsoil/natural ground layers of a rail bed generally consisting of softer soils. One embodiment includes a method of installing subsurface inclusions and ballast fills comprising injected slurry mixtures of stabilizing material such as cement grout mixed with in situ soil. Another embodiment includes a system of installed ground inclusions and ballast fills. Another embodiment includes an integrated system of equipment for emplacing the system of inclusions and ballast fills.

12 Claims, 16 Drawing Sheets

(51) Int. Cl.
*E01B 2/00* (2006.01)
*E01B 37/00* (2006.01)

(58) Field of Classification Search
USPC .............................................................. 238/2
See application file for complete search history.

(56) References Cited

U.S. PATENT DOCUMENTS

| | | | |
|---|---|---|---|
| 3,300,988 | A | 1/1967 | Phares et al. |
| 3,397,542 | A | 8/1968 | Moulden |
| 3,804,025 | A | 4/1974 | Elliott |
| 4,058,986 | A | 11/1977 | Granholm |
| 4,084,381 | A | 4/1978 | Cain et al. |
| 4,233,015 | A | 11/1980 | Teague et al. |
| 4,451,180 | A | 5/1984 | Duval |
| 4,570,553 | A | 2/1986 | Ito |
| 4,652,180 | A | 3/1987 | Jenkins, Jr. |
| 5,756,903 | A | 5/1998 | Norby et al. |
| 5,980,446 | A | 11/1999 | Loomis et al. |
| 6,863,475 | B2 | 3/2005 | DeVaull, III et al. |
| 10,214,864 | B2 | 2/2019 | Brunninger |
| 2016/0208451 | A1 | 7/2016 | White et al. |
| 2017/0159257 | A1 | 6/2017 | White |
| 2018/0179709 | A1 | 6/2018 | Brunninger |

FOREIGN PATENT DOCUMENTS

| | | |
|---|---|---|
| JP | S60152719 A | 8/1985 |
| KR | 20140113087 A | 9/2014 |
| NO | 20160273 A1 | 8/2016 |
| WO | 2012028895 A1 | 3/2012 |

OTHER PUBLICATIONS

New Zealand Examination Report dated Feb. 11, 2020 in New Zealand Application No. 750945, 4 pages.
Australian Examination Report dated Jun. 5, 2020 in Australian Application No. 2019201223, 6 pages.
Canadian Examination Search Report dated Jan. 17, 2023 in counterpart Canadian Application No. 3,039,971, 8 pages.
Canadian Office Action dated Jan. 9, 2024 in counterpart Canadian Application No. 3,039,971, 8 pages.
Australian Examination Report dated Nov. 30, 2021 in Australian Application No. 202100883, 5 pages.

* cited by examiner

SYSTEM AND METHOD FOR SUBGRADE STABILIZATION OF RAILROAD BED

CROSS REFERENCE TO RELATED APPLICATIONS

This application is a continuation of U.S. application Ser. No. 15/902,888, filed Feb. 22, 2018; the entirety of the related application being incorporated herein by reference.

FIELD OF THE INVENTION

The invention relates to maintenance and repair of railroad or track beds, and more particularly, to a system and method for repairing and stabilizing subgrade and subsoil/natural ground layers of a railroad bed.

BACKGROUND OF THE INVENTION

Railroad lines traverse hundreds of thousands of miles across the US and other countries. As time has progressed, railroad transportation has evolved into use of trains with greater load carrying capacity and speed. Increased railway traffic is common in many areas. Considering the extensive railway networks in many countries that continue to expand, railway maintenance and repair has become an increasingly complex and costly.

A typical construction for a rail bed includes a formed subgrade and one or more ballast layers. The upper layer of clean ballast stabilizes the network of cross ties and rails. Depending upon drainage requirements, the subgrade and ballast layers may extend above the adjacent ground surface. Accordingly, the rail bed crown may substantially differ over the designated length of a rail bed section.

Current methods for maintenance and repair typically require equipment to be rail loaded and transported to the jobsite and then offloaded and prepared for operation. For rail beds that have access by adjacent roads, the equipment still must be offloaded from trailers or other hauling systems. Once arriving at the jobsite, the maintenance/repair involves the use of equipment to gain access to the subgrade or subsoil along the lateral sides of the rail bed. Once the work is complete, the equipment is reloaded and moved to the next jobsite. The process of loading, unloading, and reloading the equipment is time-consuming. Lateral access to the rail bed may require significant removal of other rail bed layer such as one or more layers of subgrade and one or more layers of ballast. Accordingly, the repair cannot specifically target just the subgrade or subsoil because overlying layers must be first removed for many repair tasks.

Another significant drawback to existing solutions is that creating lateral access to the rail bed by undercutting the rail bed and emplacing stabilization material is in many cases merely a temporary solution. The long-term problem is the failure of the subgrade, subsoil, or both. Therefore, the packing of material to replace missing material such as within a ballast pocket by an undercut access method does not improve subgrade/subsoil conditions. Subsequent destabilization of the rail bed will ultimately occur with further and continued settling or failure of the subgrade or subsoil.

One US patent reference that discloses a method of treating subsurface layers to strengthen or stabilize the layers includes the U.S. Pat. No. 4,084,381. This reference more particularly discloses a method of injecting a slurry mix into subsurface layers at a predetermined depth and at a predetermined pattern. The slurry mix may include a limefly ash slurry consisting of water, particulate hydrated lime, particulate fly ash and a surfactant. The finished product may include stabilization for railroad track subgrade and ballast supporting cross ties and rails. The injected slurry leaves residual masses of the slurry as disposed in fissures or ballast pockets along the railroad track.

Another reference relating to repair or restructuring of railroad beds is the U.S. Pat. No. 4,451,180. This reference teaches a method for restructuring a railway roadbed by injecting an amount of structural slurry effective to form a substantially continuous structured layer that provides increased load carrying capacity to the roadbed. The injected slurry substantially blocks the intrusion of water into the subgrade through the ballast of the roadbed which therefore limits the upward intrusion of subgrade soil into the ballast.

Considering the current methods of maintenance and repair, there is a need for a system and method that minimizes railroad track down time during the maintenance/repair activities. There is further a need for a system and method which is cost effective and reduces manpower requirements. There is also need for a system and method which enables equipment to be quickly deployed and redeployed after job completion. There is yet a further need for a method for treating and improving the soils at depth rather than just a surface treatment method, and the construction of reinforcing elements to improve the existing soils.

SUMMARY OF THE INVENTION

The invention is a system and method for maintenance and repair of railroad beds (rail beds) or track beds, and more particularly, to a system and method for repairing and stabilizing subgrade and subsoil/natural ground layers of a rail bed.

According to one preferred embodiment, the invention is a method of installing subsurface inclusions comprising injected slurry mixtures of stabilizing material such as cement grout mixed with in situ soil. The inclusions may substantially increase subgrade bearing capacity and shear strength. The inclusions when installed are in the general shape of a cylindrical column with a selected diameter and depth depending upon the subsurface and subsoil conditions to be repaired. One example range for the diameter of the inclusions is 8 to 16 inches in diameter. One example range for the depth of the inclusions may be 10 to 30 feet deep.

According to a preferred arrangement or configuration for the inclusions, two sets or rows of inclusions can be installed or pairs of sets can be installed. The individual inclusions are selectively spaced along a length of the railroad bed. According to another preferred arrangement, one or more additional sets or rows of inclusions can be installed. According to yet another preferred arrangement, a selected number of sets of rows may be installed along with additional individual and selectively spaced inclusions located at particularly weak or damaged subgrade areas.

Regarding spacing of the inclusions, the inclusions may be located between each cross tie, between every other cross tie, or further spaced between other groups of cross ties. The sets or rows of inclusions are preferably employed with individual inclusions installed in lateral pairs. Spacing is also dependent on the condition of the track and "softness" of the soil According to another preferred embodiment of the invention, it is a system of installed ground inclusions incorporated within a rail bed to stabilize subgrade and subsoil conditions. The system includes a plurality of predetermined spaced inclusions that are installed by a drilling rig. Holes are drilled, and the space within each hole as well as some soil outward from the drilled hole, is mixed with and is filled with a selected slurry mixture which may include cement grout and soil. The inclusions are emplaced substantially vertical or the inclusions may be emplaced at a desired angle to the vertical. The inclusions may have a range of diameters and depths in which selected inclusions are sized to achieve optimal subgrade and/or subsoil stabilization.

According to yet another aspect of the system of installed inclusions, these may be supplemented with ballast fills to fill ballast pockets that may develop anywhere within the strata of the rail bed, but are commonly found between the upper portion of the clean ballast subgrade and the lower portion of the lowermost ballast layer that has been mixed with soil over time. The ballast fills are created by retraction of the drills to an elevation where a ballast pocket is found, and then injecting a sufficient amount of a slurry mix (e.g. cement grout and soil) to completely fill the ballast pocket, or to otherwise fill the ballast pocket to a degree which provides necessary stabilization. The filling of the ballast pockets inherently happens when an inclusion is created since the inclusion communicates with the ballast pocket. Therefore, a ballast pocket is automatically filed without additional targeting efforts.

Inclusions and ballast fills in one aspect may communicate with one another so there is a continuous amount of slurry mix which interconnects one or more inclusions and a ballast fill. Alternatively, a ballast fill may be installed as a single support element in situations where the subgrade beneath the ballast pocket may be stable and therefore does not require an inclusion.

According to another preferred embodiment, the invention is an integrated system of equipment that is rail mounted and therefore transportable to any location requiring maintenance or repair. The integrated equipment system includes a drilling rig that is used to drill and subsequently inject a grout mixture into the subgrade and/or subsoil. The series of equipment includes a locomotive power element built into a rail trailer that is used to propel the equipment along the railway. A cement silo is provided to store quantities of grout/cement materials. A jet grout mixer and pump are provided to mix grouting material and for subsequent transport of the grouting material to the drilling rig. A rail truck is provided with an onboard generator to provide power for the system equipment. The drilling rig includes a pair of drilling masts with the capability to simultaneously drill and inject grout into the subgrade/subsoil. The rail truck may also include water tanks to hold water for batching of the cement grout. Hydraulic power for the drill rig may be provided by a truck power take off (PTO), such as to power the drill masts and drill heads. A hydraulic valve system is incorporated to selectively provide a hydraulic power to the various drill rig elements requiring hydraulic power.

According to another preferred embodiment of the invention, it includes a method of installing a selected array of ground inclusions and ballast fills for a rail bed. According to one aspect of this method, holes are selectively drilled within the subgrade and/or subsoil to emplace a selected number and spacing of inclusions. Ballast fills are selectively located at the locations of corresponding ballast pockets such that the ballast fills eliminate spaces defined by the ballast pockets that typically hold water and cause track instability. The ground inclusions and ballast fills may include cement grout, a slurry mixture of cement grout and soil, or other combinations of materials. In areas where there is frequent train traffic, the injection of the repair material may be accelerated so that installed inclusions may obtain initial sets within 30 minutes to 2 hours depending on dosages and traffic windows available for injection. The inclusions will not be degraded by train traffic within this initial cure period. Preferably, the top of the inclusions are terminated at the bottom portion of the clean ballast, which may be approximately 2-3 feet below the track to ensure that the track bed loads are distributed over the inclusion array and to prevent over stressing individual cross ties or track works or fouling clean ballast and reducing the ability of subgrade and ballast maintenance by railroad personnel. However, it should be understood that the depth of termination for the inclusions can be adjusted to specific ground conditions, railroad specifications or preferences. Depending upon the degree to which ballast is displaced during emplacement of inclusions and ballast fills, some amount of track surfacing may be necessary to reshape the upper ballast layer or level the track.

According to another aspect of the method of installing the system, the system can be employed within bridge abutments thereby reducing dynamic loads on bridges and the abutments themselves. The presence of ballast pockets or otherwise failing subgrade conditions at bridge abutments results in sometimes significant increases in dynamic loads experienced by the bridge as train traffic passes. Bridge transition design can be improved by emplacing the system which may include gradually increasing inclusion array density and depth as the track approaches the bridge. The increasing subgrade strength and subgrade modulus approaching the bridge will ease the stiffness differential between a track embankment and the bridge structure itself. In this way, the rail track is further stabilized to prevent movement caused by dynamic loading from passing train traffic.

There are many advantages to the systems and methods of the invention. An economical and efficient solution is provided for improving the stability of soft subgrades thereby substantially reducing overall maintenance costs as well as minimizing interruption to railway traffic or operations. The injected grout material will not foul clean ballast. Therefore, there is no subsequent requirement to clean or replace ballast. There is no waste product produced because the material to be injected is mixed real-time within minutes of being pumped into the ground. All of the equipment is hi-rail mounted and is self sufficient. External or supplemental equipment is not required for any job thereby making the invention a global solution for subgrade and subsoil stabilization. The system of equipment is configured so that access to a desired rail is possible that typical to rail crossings similar to a hi-rail dump truck. Therefore, no support is required from railroad personnel other than basic track protection measures.

Considering the above features and aspects of the invention, in one embodiment, the invention may be considered a system for repairing rail bed underlying a railroad having rails and cross ties, the system comprising: a rail mounted vehicle; a drill mast mounted on the vehicle, the drill mast having a pair of drills and corresponding drill heads; a power source for powering the drills to selectively penetrate the rail bed; a pump; a grout source wherein the pump operates to transfer the grout through a transfer line to the drill mast; and wherein the drill heads inject the grout into the rail bed.

Additional optional features of this first aspect of the invention may include any one of following or any combination thereof: (a) a hydraulic lift mounted to the vehicle for rotating the drill mast between a first horizontal stowed position to a second vertical operating position; (b) a cement silo for storing grout material, and a transfer line connected between the silo and pump enabling transfer of grout material from the silo to the pump; (c) a rail trailer mounted on the rail ties and supporting the cement silo; (d) an engine mounted on the rail trailer, and drive tracks mounted on the rail tracks and communicating with the engine to propel the trailer; (e) wherein the drill mast is secured to the truck by a support frame; (f) wherein the vehicle has wheels enabling the vehicle to be driven off and driven onto the rail track; (g) wherein the vehicle has rail guides removably secured to the vehicle to maintain alignment of the wheels on the rail track; (h) wherein the drill heads are selectively and controllably lowered to drill holes in the rail bed and are subsequently lifted to inject grout to form inclusions in the drilled holes; and (i) wherein the truck is operated to incrementally advanced to position the drills to emplace a plurality of inclusions that are spaced from one another along a length of the rail bed.

According to another aspect of the invention, it may be considered a method for stabilizing subgrade and subsoil ground layers of a railroad bed underlying a railroad having rails and cross ties, the method comprising: providing a rail mounted vehicle, a drill mast mounted on the vehicle, the drill mast having a pair of drills and corresponding drill heads; determining a location on the railroad where the subgrade or subsoil have failed causing destabilization of the ballast upon which the rails and cross ties lie; positioning the drills over the location to a first position; drilling first holes by the drills into the subgrade and/or the subsoil; withdrawing the drills and injecting a grout mix by the drill heads as the drills are withdrawn to form corresponding first inclusions in the first drilled holes; moving the vehicle and repositioning the drills over the location to a second position spaced from the first position; drilling second holes by the drills; and withdrawing the drills and injecting the grout mix by the drill heads as the drills are withdrawn to form corresponding second inclusions in the second drilled holes.

Additional optional features of this second aspect of the invention may include any one of following or any combination thereof: (a) injecting the grout mix in a ballast pocket to fill the ballast pocket forming ballast fill that communicates with at least one inclusion; (b) varying a rate of injection of the grout mix through the drills to selectively form the inclusions considering a volume of the drilled holes; (c) varying a rate of injection of the grout mix through the drills to selectively form the ballast fill considering a volume of the ballast pocket; (d) determining a scope of the failed subgrade and/or subsoil; determining a number of inclusions required to repair the subgrade and/or subsoil; (e) predetermining an array of inclusions to emplace considering the number of inclusions required; and sequentially emplacing the array of inclusions including a plurality of the inclusions that are spaced along a length of the railroad and spaced laterally from one another; (f) wherein the array comprises a preselected number of rows of inclusions and a preselected lateral spacing of the inclusions in the rows; (g) wherein the rows include at least two rows of inclusions extending along a length of the railroad; (h) wherein the lateral spacing of the inclusions include at least one of a pair of laterally aligned inclusions located on interior sides of corresponding rail tracks; (i) wherein the lateral spacing of the inclusions include at least one of a pair of laterally aligned inclusions located on exterior sides of corresponding rail tracks; (j) wherein the lateral spacing of the inclusions includes at least three laterally aligned inclusions; (k) rotating the drill mast from a first stowed position to a second vertical operating position for drilling the holes; (l) selectively changing a lateral spacing of the drills on the drill mast to match a desired lateral spacing of inclusions to be formed; and (m) wherein the vehicle and drill mast remain mounted on the railroad during emplacement of the inclusions.

According to another aspect of the invention, it may be considered a method for stabilizing subgrade and subsoil ground layers of a railroad bed underlying a railroad having rails and cross ties, the method comprising: providing a rail mounted vehicle, a drill mast mounted on the vehicle, the drill mast having at least one drill and a corresponding drill head; determining a location on the railroad where the subgrade or subsoil have failed causing destabilization of the ballast upon which the rails and cross ties lie; predetermining an array of inclusions to be emplaced to stabilize the subgrade and/or subsoil, the predetermining step including a measure of a distance and depth for an area to be stabilized at the location; positioning the at least one drill over a first position and forming at least inclusion; automatically moving the at least one drill to a subsequent second position and forming another inclusion according to the predetermined array.

According to yet another aspect of the invention, it may be considered a method for determining a design for stabilizing a rail bed comprising: identifying a rail bed with one or more failed subsurface areas; determining an area of the failed areas; determining a depth of the failed areas under a surface of the rail bed; calculating a required bearing capacity of the rail bed; determining a differential between an actual bearing capacity considering the failed subsurface areas and the required bearing capacity; determining an optimum subgrade stiffness modulus;

calculating a number of subsurface inclusions required to stabilize the rail bed including a spacing between the subsurface inclusions, depths of emplacement, and sizes of the inclusions; automatically generating a design layout with depicted subsurface inclusions and spacing. This method may further include stabilizing the rail bed by emplacement of inclusions according to the design layout by rail mounted equipment including a high rail mounted drilling rig.

Other features and advantages of the invention will become apparent from review the following detailed ascription taken in conjunction with the accompanying drawings.

DETAILED DESCRIPTION

Figure 1:
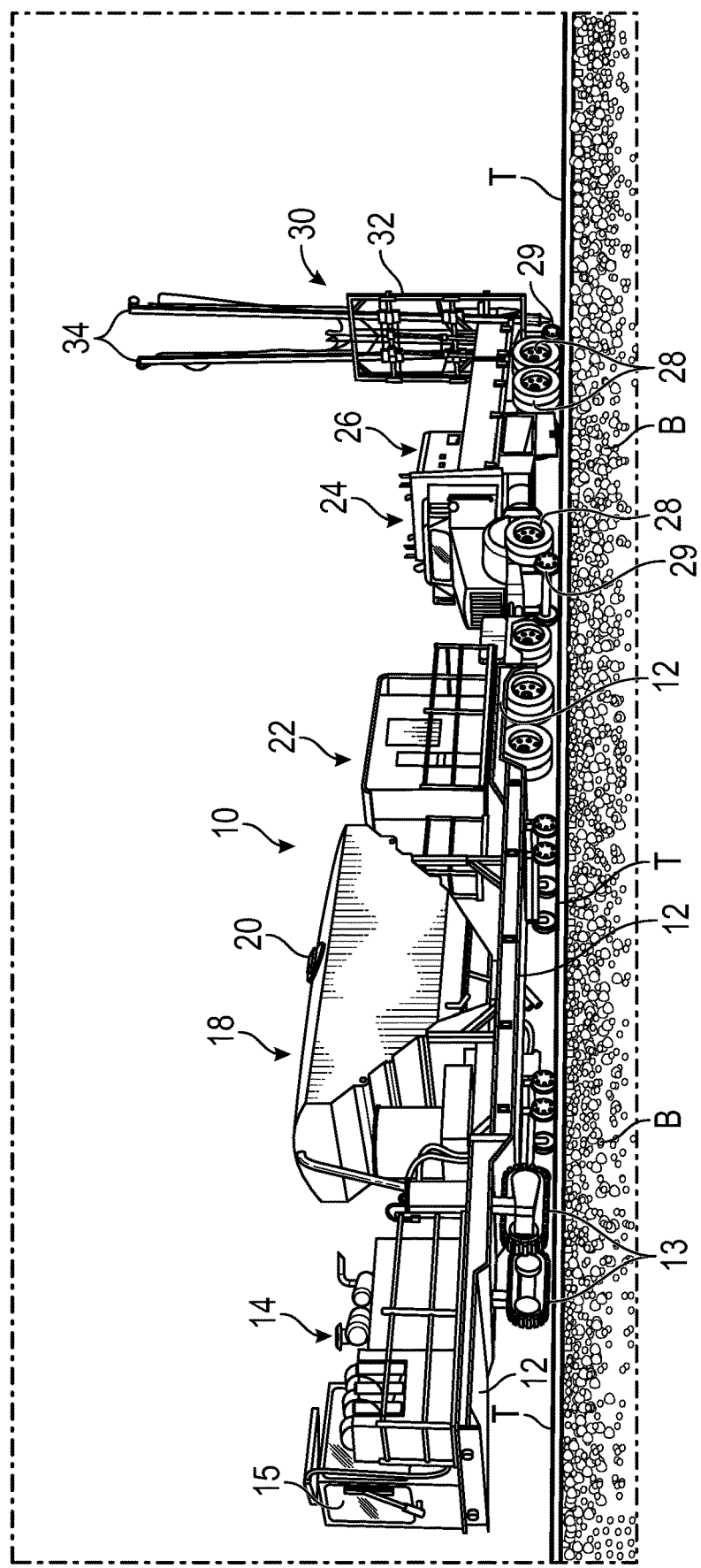
FIG. 1 is a perspective view of the rail mounted system of the invention including a depiction of the major components or pieces of equipment making up the system.

FIG. 1 is a perspective view of the rail mounted system of the invention including a depiction of major components or pieces of equipment making up a system 10 mounted on a railroad with tracks T. The major components of the equipment comprise three elements mounted on a trailer 12 illustrated as an engine 14, a cement silo 18, and a combined jet grout mixer and a pump unit 22. The other major component includes a hi-rail truck 24 and a drill mast assembly mounted to the truck 24.

The trailer 12 has drive tracks 13 that are propelled by the engine 14. A cab 15 is provided for an operator to control the engine 14. The cement silo 18 holds a desired quantity of cement grout mix in preparation for installation of the ground inclusions and ballast fills. An inlet port 20 allows for charging the cement silo with the grout materials. The jet grout mixer and pump unit 22 are employed to mix the grout materials received from the cement silo 18 and to convey the mixed grout to a drill mast assembly 30. In one configuration, the pump unit draws grout material from the cement silo 18 and introduces the material to a downstream mixer that mixes the grout with water. An outlet of the mixer communicates with the drill mast assembly to convey the mixed grout for injection. One or more grout material conveying lines (not shown) are provided between the cement silo 18 and the jet grout mixer and pump unit 22. Another group of conveying lines (not shown) carries the mixed grout material to the drill mast assembly with the drills 44.

The hi-rail truck 24 is also rail mounted and is connected to the trailer 12. The hi-rail truck incorporates one or more power takeoff shafts (PTOs) that can be used to power a hydraulic pump (not shown) mounted to the truck to provide hydraulic power to operate the drill mast assembly 30. The bed of the truck 24 may also have an electric generator 26 loaded thereon, such as a diesel generator, which is capable of providing power for the overall equipment system 10, job site lighting, or other electrical power needs that may arise at a job site.

The truck 24 is further equipped with railway guide wheels 29 that enable the truck 24 to be transported along a rail line. The wheels 28 of the truck 24 preferably rest upon and are centered along the upper surfaces of the tracks T. The truck may be separated from a rail line in which the railway guide wheels 29 are either retracted or removed enabling the truck 24 to be driven to another location as necessary. A plurality of water tanks 36 are mounted to the vehicle and provide a water supply for mixing of the grout during batching. Accordingly, grout can be mixed immediately with a supply of water that is rail mounted with the other equipment. There is no need to search for an onsite water source.

Figure 2:
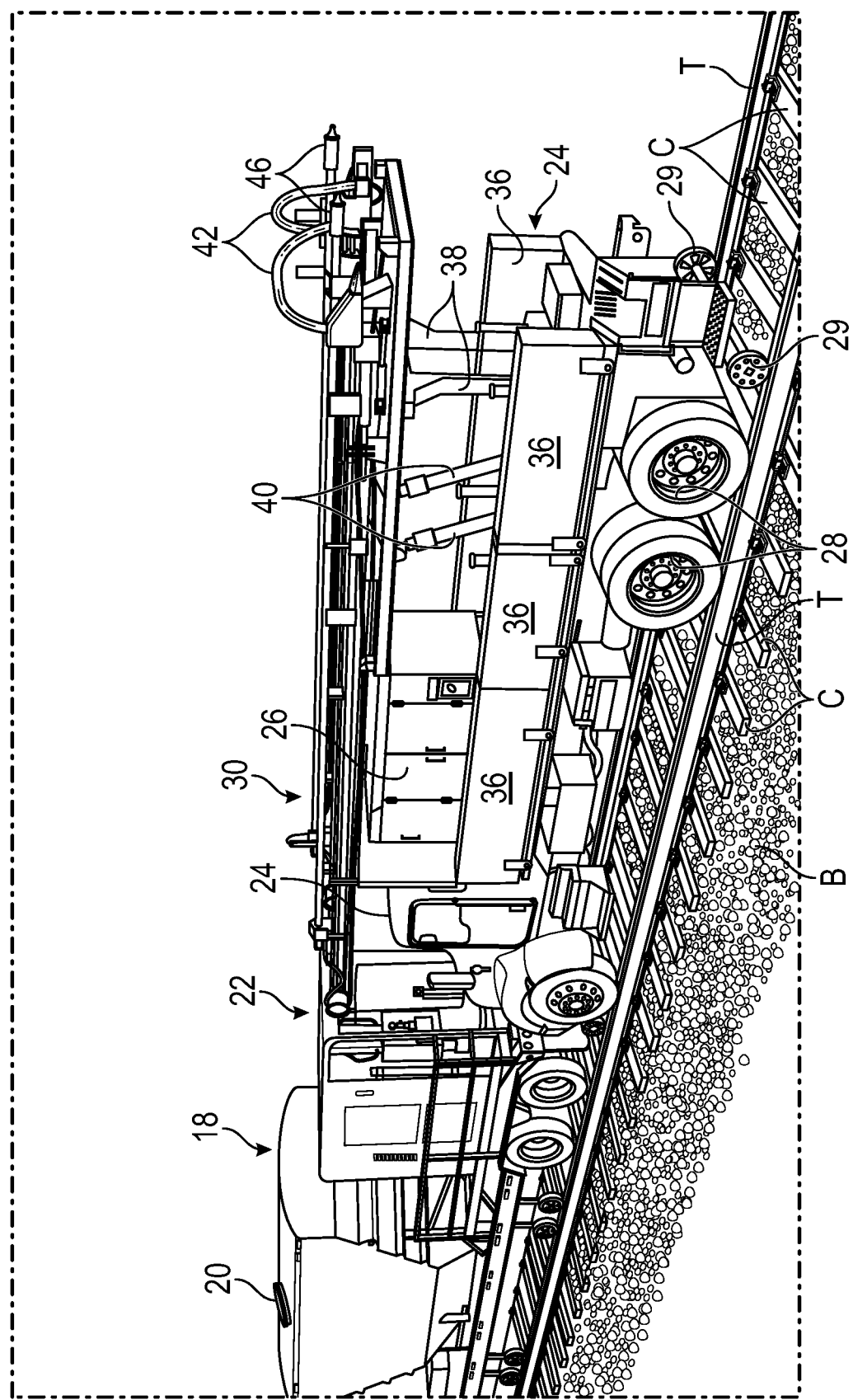
FIG. 2 is an enlarged perspective view showing components of the equipment system including a drilling rig, jet grout mixture and pump, and cement silo.
Figure 3:
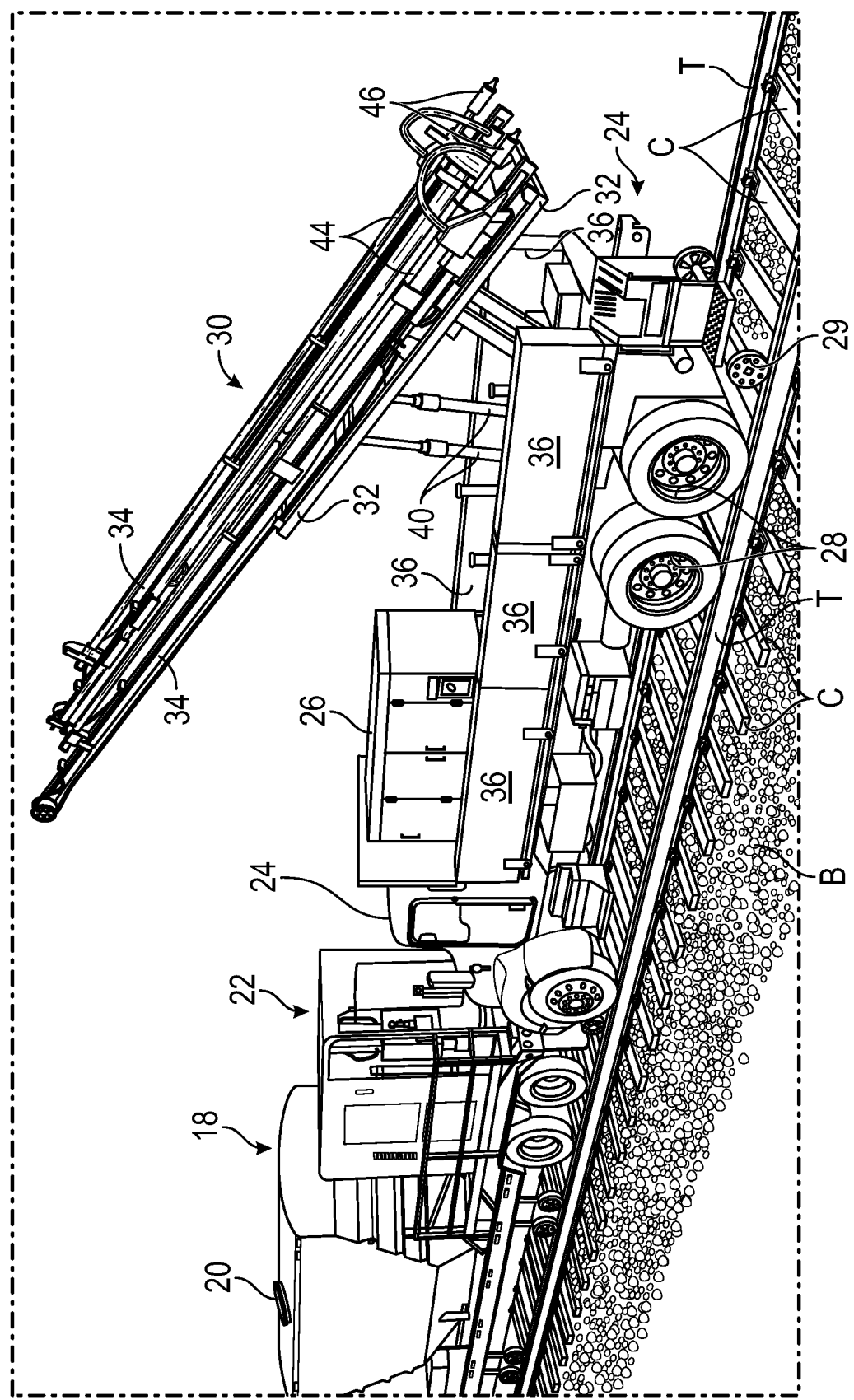
FIG. 3 is another perspective view of the equipment shown in FIG. 2 and further illustrating a drill mast of the drill rig as it is rotated for deployment from a stowed position.
Figure 4:
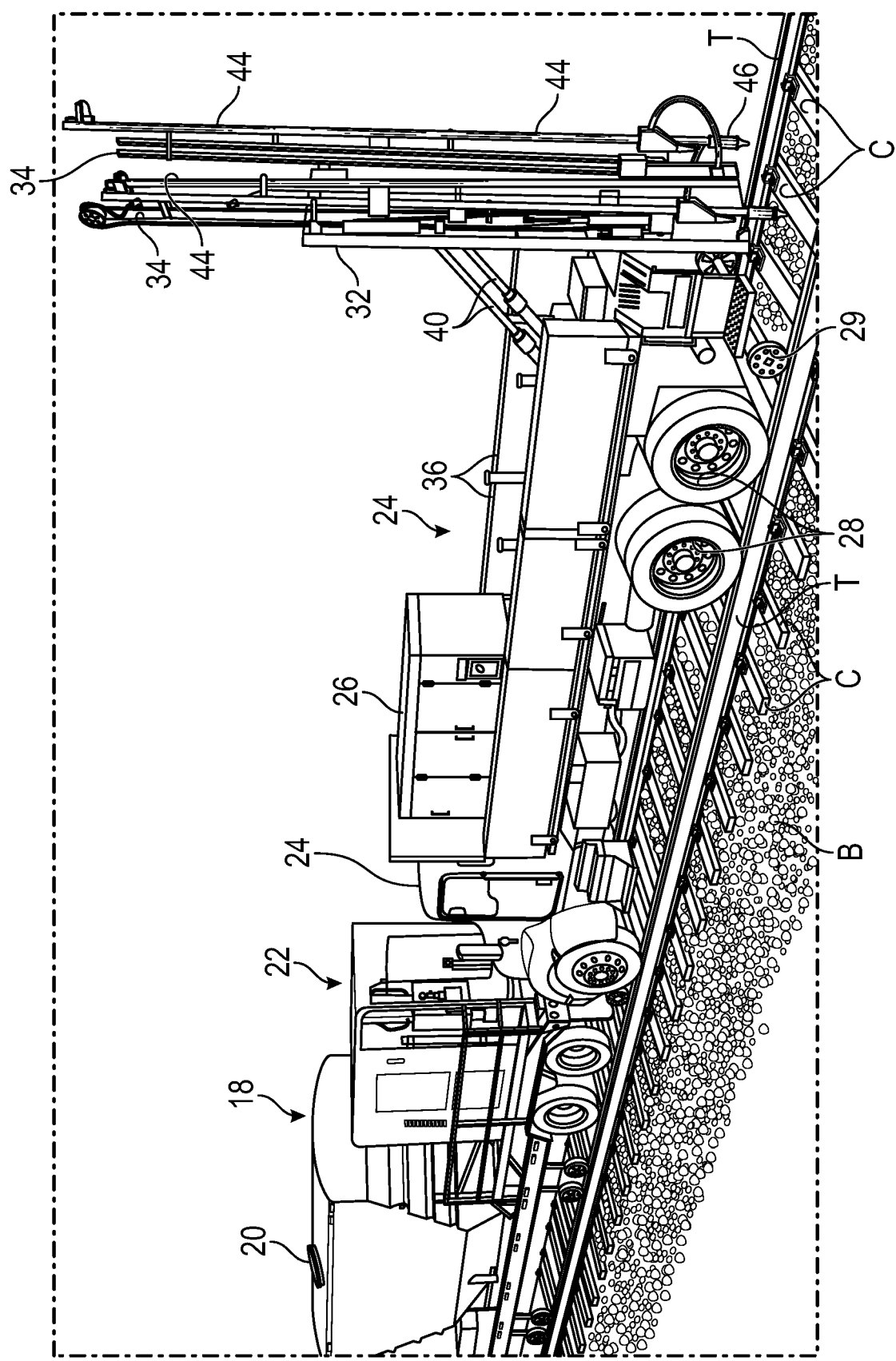
FIG. 4 is another perspective view of the equipment shown in FIG. 2, and further illustrating the drill mast in a fully deployed position.

Referring also to FIGS. 2-4, these figures show further details of the equipment including a drilling rig comprising the drill mast assembly 30. In FIG. 2, the drill mast assembly 30 is shown in a stowed position, FIG. 3 shows the drill mast assembly 30 in a partially raised position, and FIG. 4 shows the drill mast assembly in a fully raised or deployed position. The drill mast assembly 30 includes a drill mast frame 32 which supports two drill masts 34. The drill mast frame 32 is rotatably attached to the rail truck by a support frame 38. A pair of hydraulic lift cylinders 40 is operated to raise and lower the drill mast assembly. One end of each of the lift cylinders is secured to a bed of the rail truck 24, and the opposite ends are secured to the drill mast frame 32. The drill mast assembly may be precisely moved to the fully deployed position so that the drill masts 34 introduce the drill heads 46 of the drills 44 at a desired inclination angle. In most cases, the drills 44 are oriented substantially vertical, but in some cases, the drills may require positioning at a slight angle.

Figure 5:
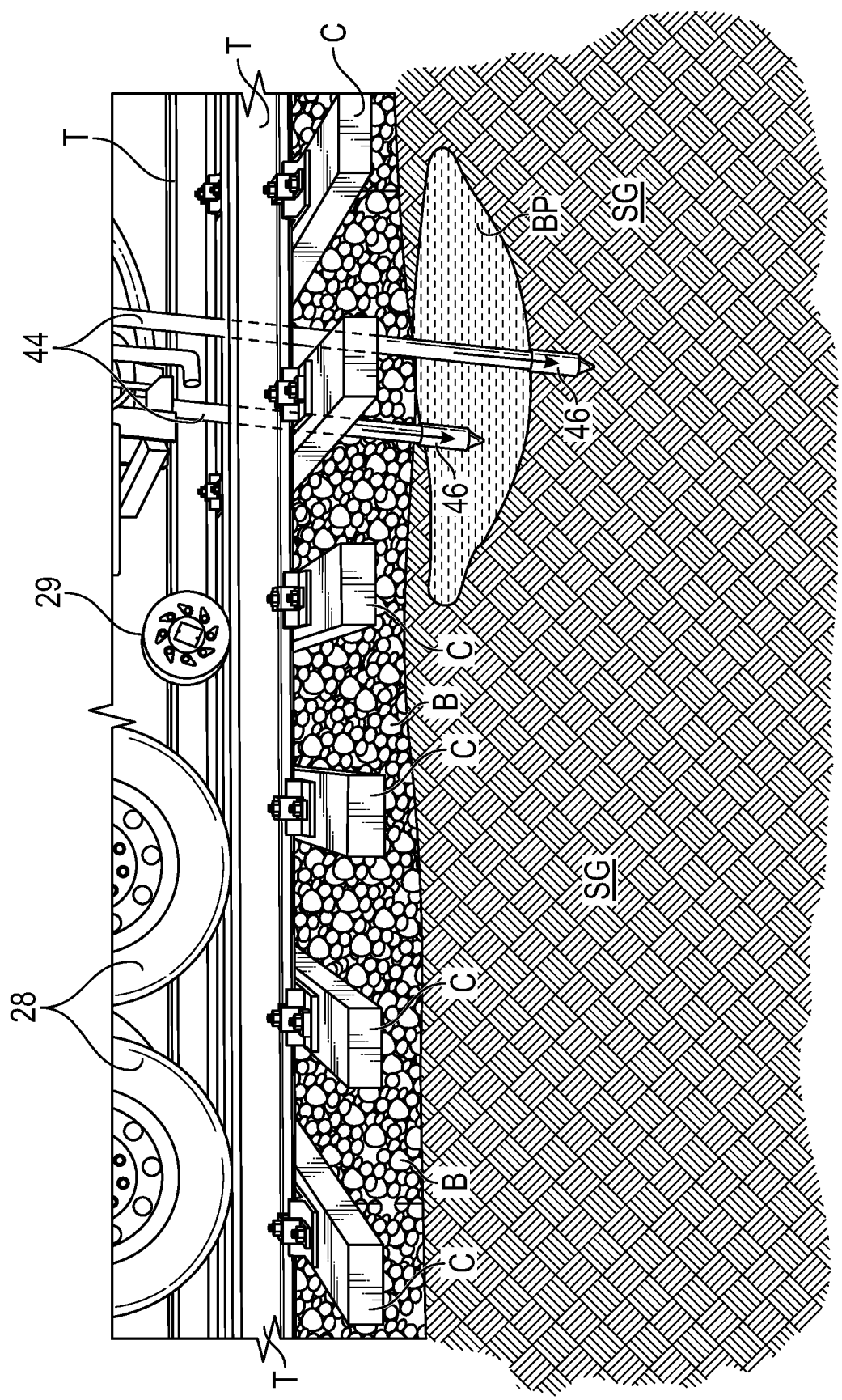
FIG. 5 is a greatly enlarged perspective view showing the drilling heads penetrating the ballast and subgrade.

FIG. 5 is a greatly enlarged perspective view showing the drilling heads 46 penetrating the ballast B and subgrade SG in a downward descent. More specifically, the drill mast 34 is operated to hydraulically power the drills 44 to penetrate the subgrade SG a desired depth. In this example, the drill heads 46 are oriented on the inside edges of the tracks T to penetrate the ground between respective cross ties T. FIG. 5 also shows a ballast pocket BP in the subgrade.

Figure 6:
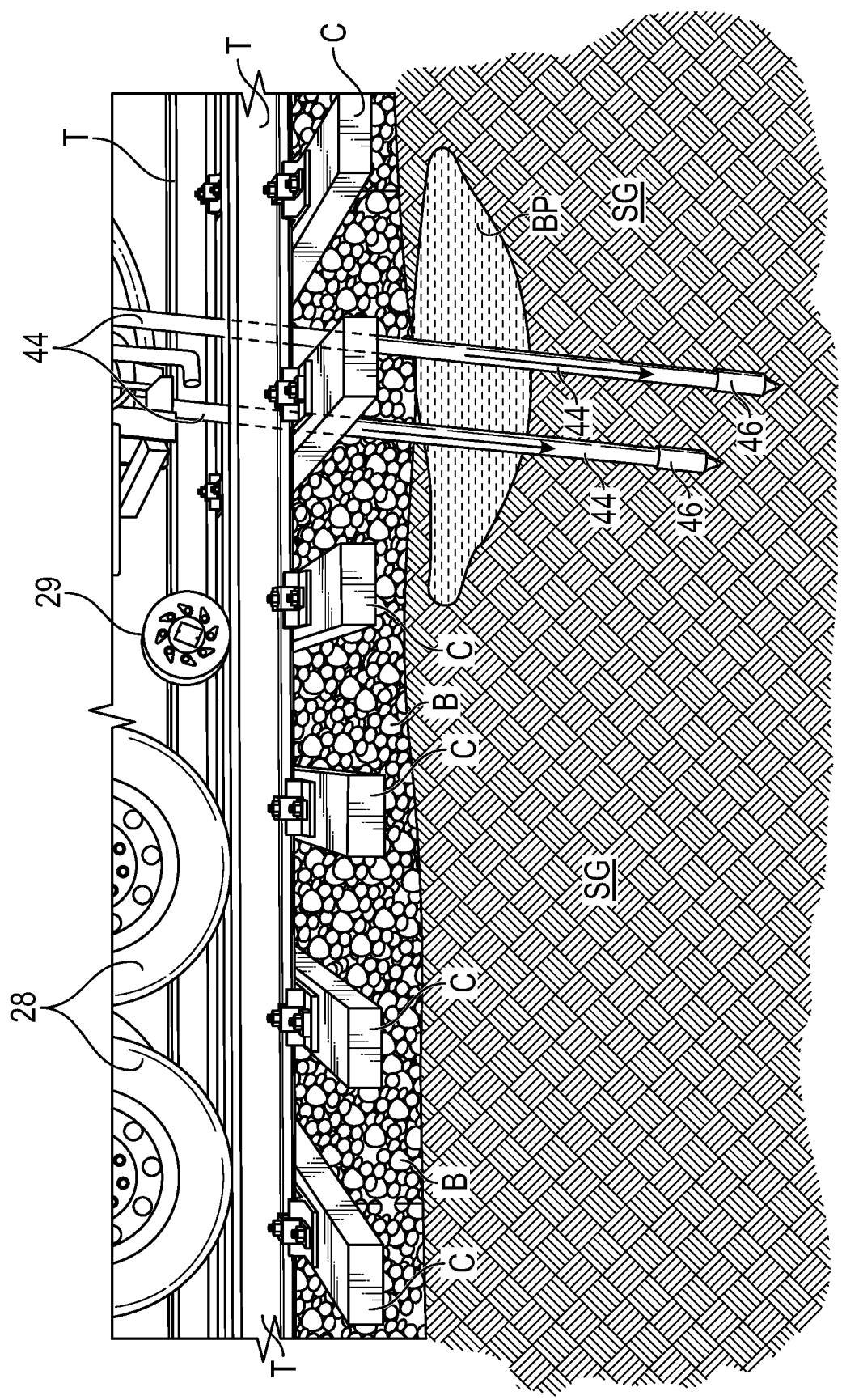
FIG. 6 is another greatly enlarged perspective view showing the drilling heads further penetrating the subgrade beyond a ballast pocket.

FIG. 6 is another greatly enlarged perspective view showing the drilling heads further penetrating the subgrade beyond the ballast pocket BP to a desired depth to commence grout injection through the bores of the drills 44 and out through nozzles in the drilling heads 46. As the drills penetrate, they mix the soil in the drilled holes. The drills may have a desired exterior flute or projection design so that some amount of the soil material is evacuated making space for the injected grout while some soil material remains within the hole to mix with the grout. A desired concentration mix of soil and grout can be predetermined at the jobsite based on the type of soil present. One objective however is to not generate a significant amount of waste soil that requires removal. Accordingly, a preferred procedure is one in which a minimum amount of waste soil is generated from the drilled holes, and this minimum amount will not materially contaminate the ballast fill over the drilled holes.

Figure 7:
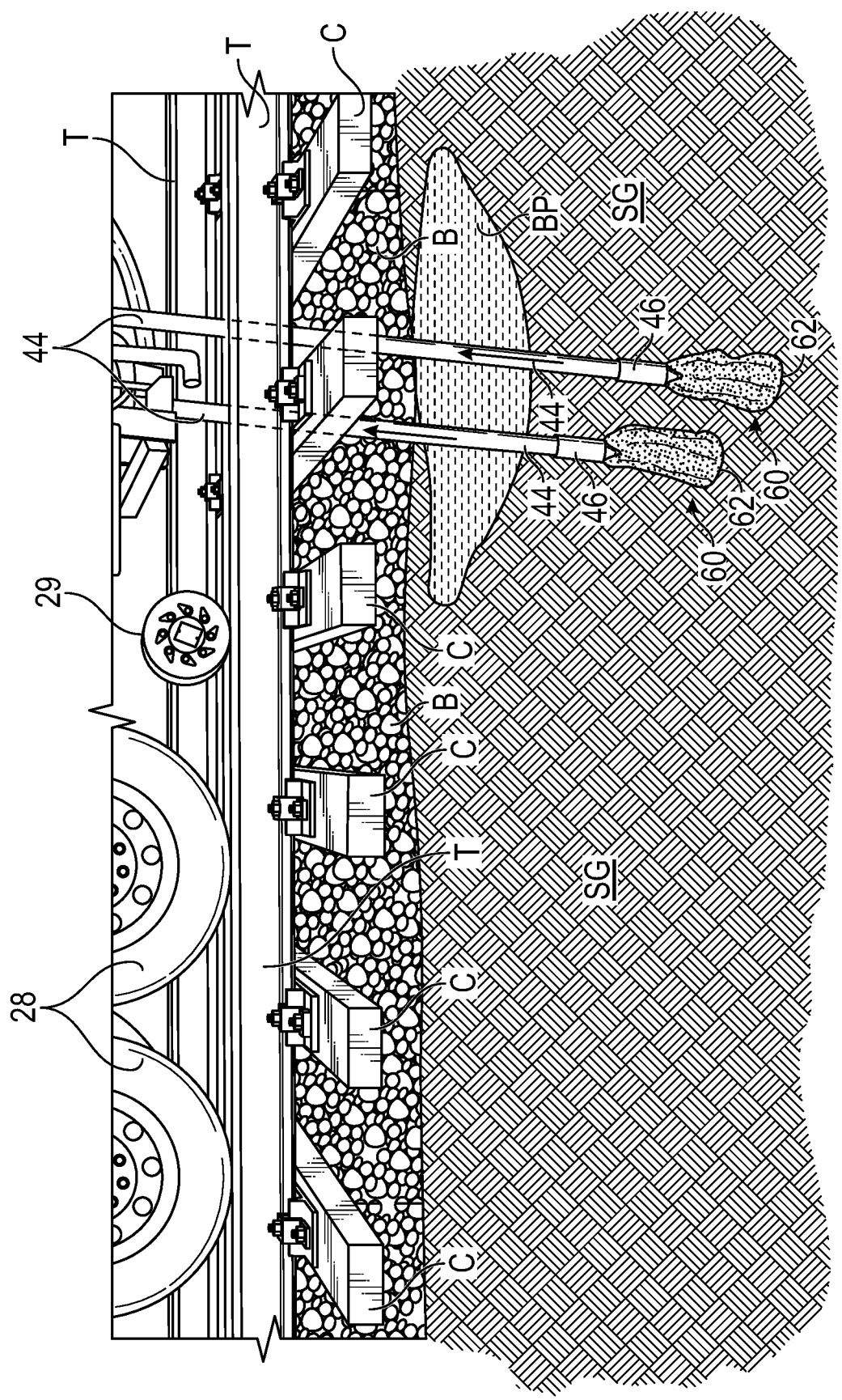
FIG. 7 is another greatly enlarged perspective view showing the drilling heads being retracted from their fully inserted position and injecting a grout slurry mixture in the drilled holes and mixing the grout slurry with in-situ soils.

FIG. 7 is another greatly enlarged perspective view showing the drilling heads 46 being retracted from their fully inserted position and injecting a grout mixture in the drilled holes to form a soil-grout mixture inclusion or subsurface column 60. The shape of the inclusions is generally cylindrical. More specifically, the grout mixture may be defined as cement grout that is mixed with the existing soil to form a cementitious slurry. The cement grout is injected through the drill heads 46 at a pressure, therefore this technique may be also described as a hydrodynamic mix-in-place technique that produces a soil-cement column or rigid inclusion that improves the soil both in bearing strength and shear strength. The diameter of the installed inclusions is dependent on actual in-situ soil conditions. A minimum diameter for the inclusions may be approximately 6 inches based on injection pressures and the drill head diameters. As mentioned, injection pressures may be varied to increase or decrease the rate of flow of cement grout which can be adjusted to achieve a desired soil-cement mixture ratio, as well as to most efficiently fill drilled holes and ballast pockets.

Figure 8:
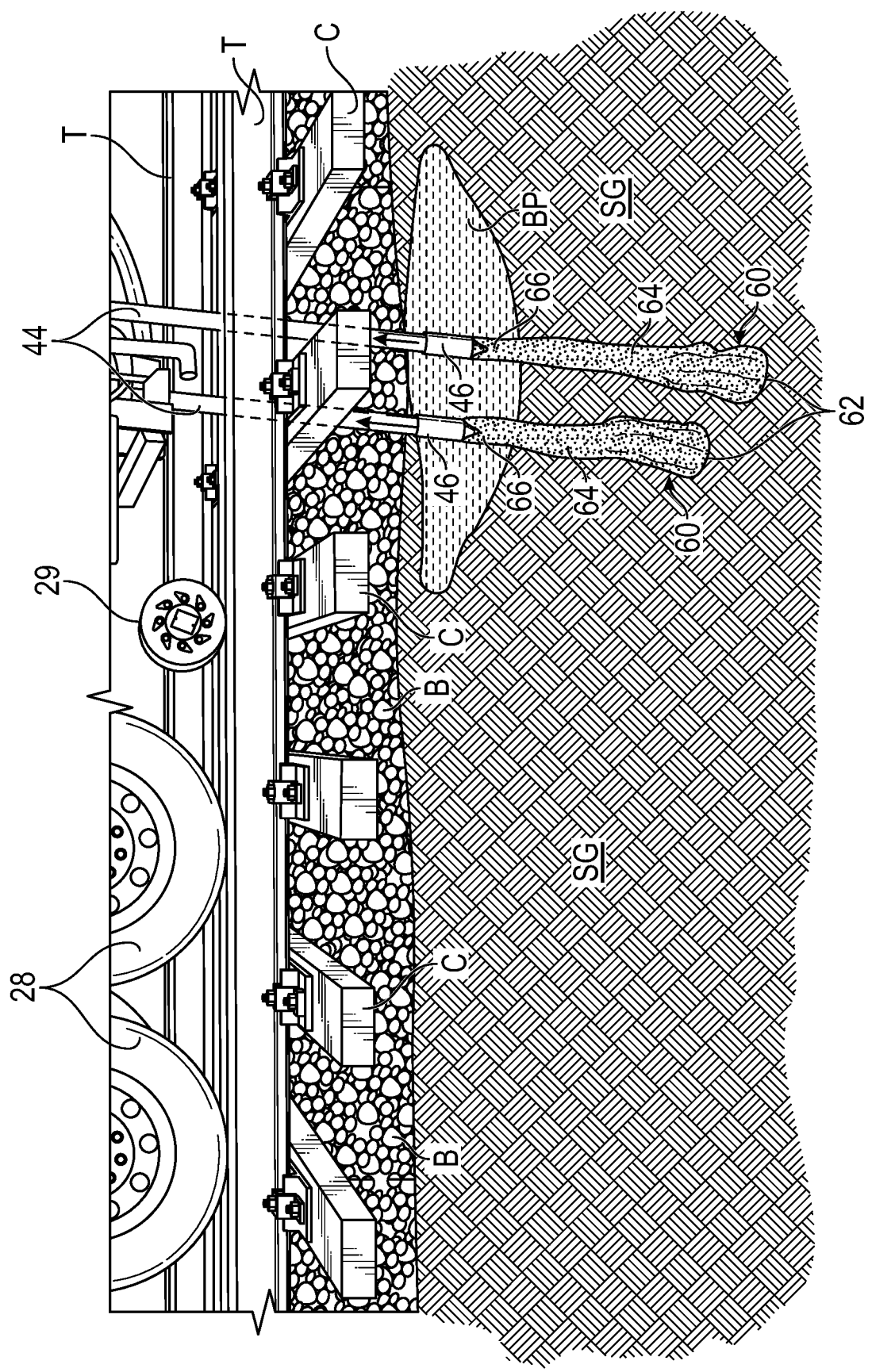
FIG. 8 is another greatly enlarged perspective view showing the drilling heads being further retracted to inject additional grout in the boreholes and being lifted or retracted to an elevation within a ballast pocket.

FIG. 8 is another greatly enlarged perspective view showing the drilling heads 46 being further retracted to inject additional grout material in the drilled holes and lifted to an elevation within the ballast pocket BP. At this point, the lifting of the drills is paused so that the ballast pocket can be filled. The pump unit 22 may have a pressure sensing capability to adjust a volumetric flow of the grout material based on pressure associated with the injection. Increased delivery line pressure will indicate when a drilled hole is adequately filled as well as when a ballast pocket is adequately filled.

Figure 9:
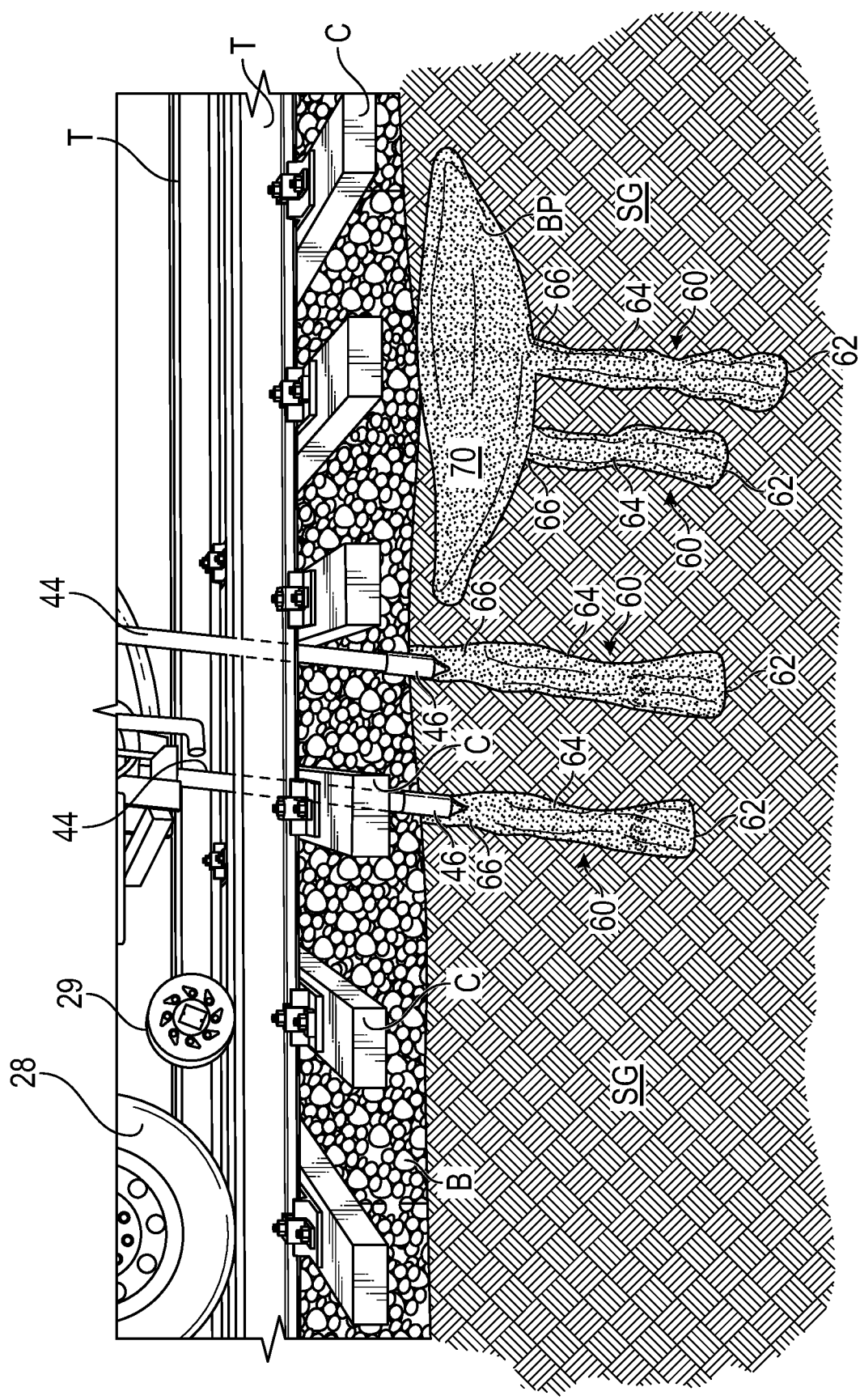
FIG. 9 is another greatly enlarged perspective view showing the drilling heads moved to a subsequent inclusion emplacement and in which the ballast pocket was previously filled with the desired grout material.

FIG. 9 is yet another greatly enlarged perspective view showing the drilling heads 46 moved to a subsequent inclusion emplacement and showing the ballast pocket BP as filled forming a subsurface ballast fill 70. The truck 24 is operated to propel the system a desired incremental distance along the tracks T for emplacement of the subsequent inclusion emplacements.

Figure 10:
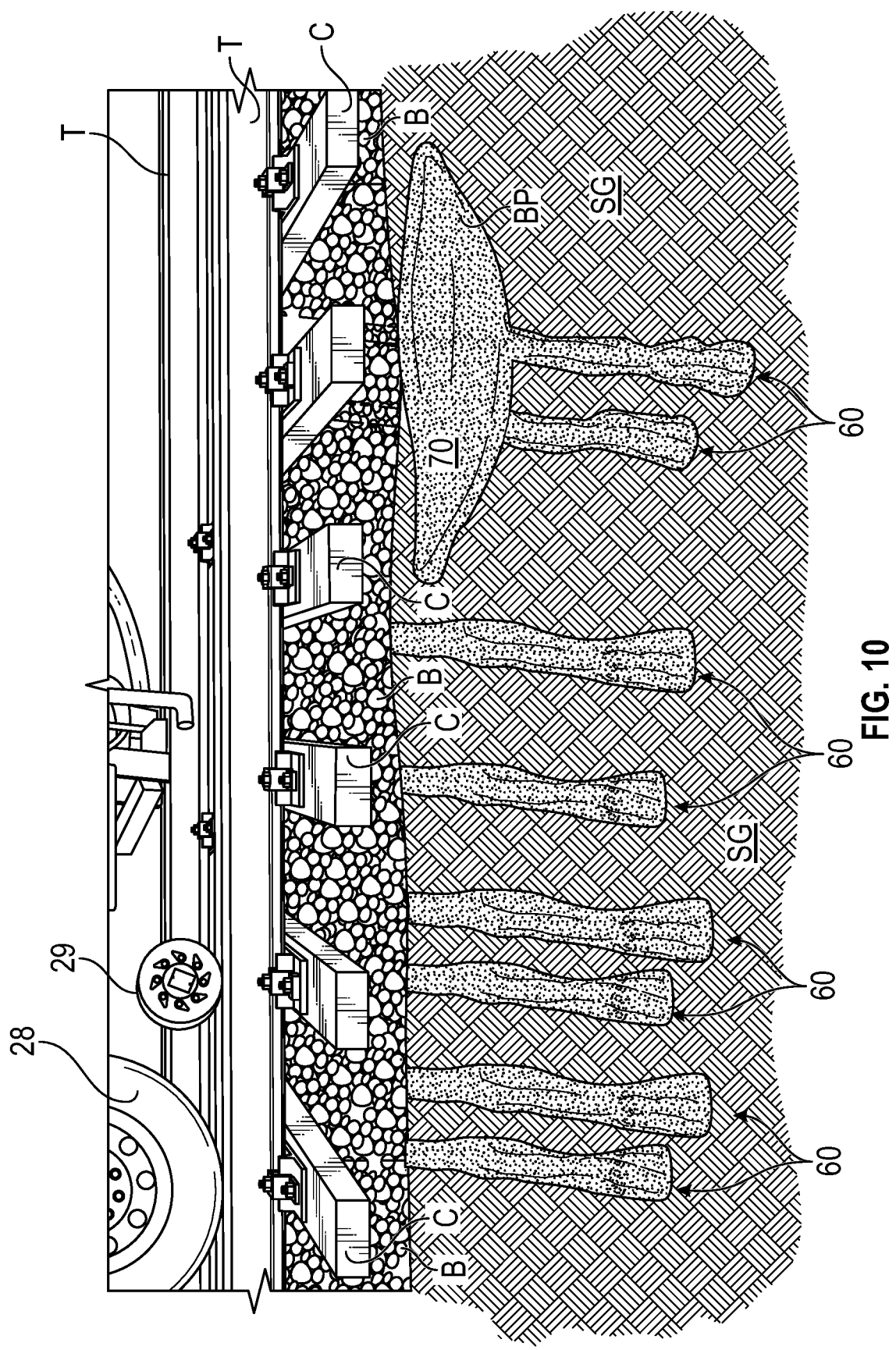
FIG. 10 is yet another greatly enlarged perspective view showing a plurality of inclusions emplaced in an array.

FIG. 10 is yet another greatly enlarged perspective view showing a plurality of inclusions 60 emplaced in an array comprising two rows or sets of inclusions 60 and a ballast fill 70. A desired number and pattern or array of inclusions and ballast fills may be emplaced by incremental movement of the truck along the rails. Because the equipment remains rail mounted, and because drilling can occur directly from the drill mast aligned over the rail tracks and cross ties, there is no additional effort required to reposition the equipment or to move raw materials to the job site. Accordingly, the system and method of the invention is fully mobile and greatly reduces manpower and overall costs associated with traditional railroad repair and maintenance.

The drills 44 may be laterally displaced on the drill rig to achieve different lateral spacing of emplaced inclusions. Specifically, the drills may each be independently shifted in a lateral direction so that inclusions can be emplaced at any desired lateral spacing on the rail bed.

Figure 11:
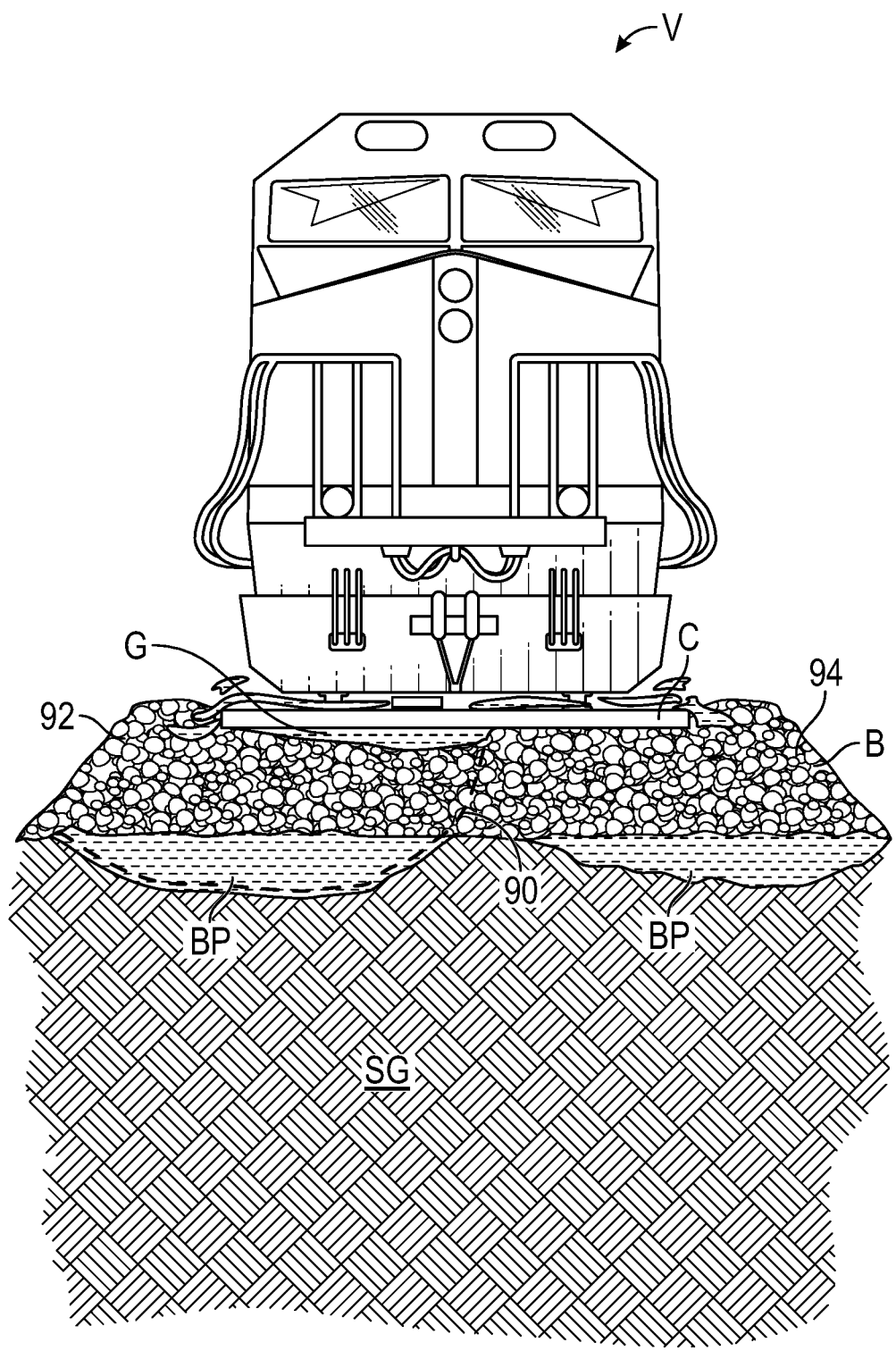
FIG. 11 is a cross-sectional elevation view of a rail bed showing a failed ballast layer caused by shifting or settling of the underlying subgrade and/or subsoil.

FIG. 11 is a cross-sectional elevation view of a rail bed showing a failed ballast layer B caused by shifting or settling of the underlying subgrade SG and/or subsoil. A rail vehicle V is illustrated over the rail bed. The ballast layer B forms an upper layer or crown of the rail bed as shown. Two laterally spaced ballast pockets BP underlie the ballast layer B. In addition to the ballast pockets, another gap exists between the cross ties T and the upper portion of the ballast layer B shown as gap G. This gap G along with the ballast pockets BP result in shifting and settling of the cross ties and rails. The displaced locations of the cross ties and rails along with inadequate support to withstand the dynamic loading of a passing train results in a compounded rail bed failure that may create a significant potential danger to rail operations. A worst case scenario is one in which a train can derail as caused by excessive displacement of the tracks T and cross ties C. FIG. 11 also shows a shear failure line 90 that is intended to represent an example of how the ballast B can slip and settle between adjacent ballast sections 92 and 94. In this example, the shear failure causes ballast section 92 to sink and shift resulting in the formation of gap G.

Figure 12:
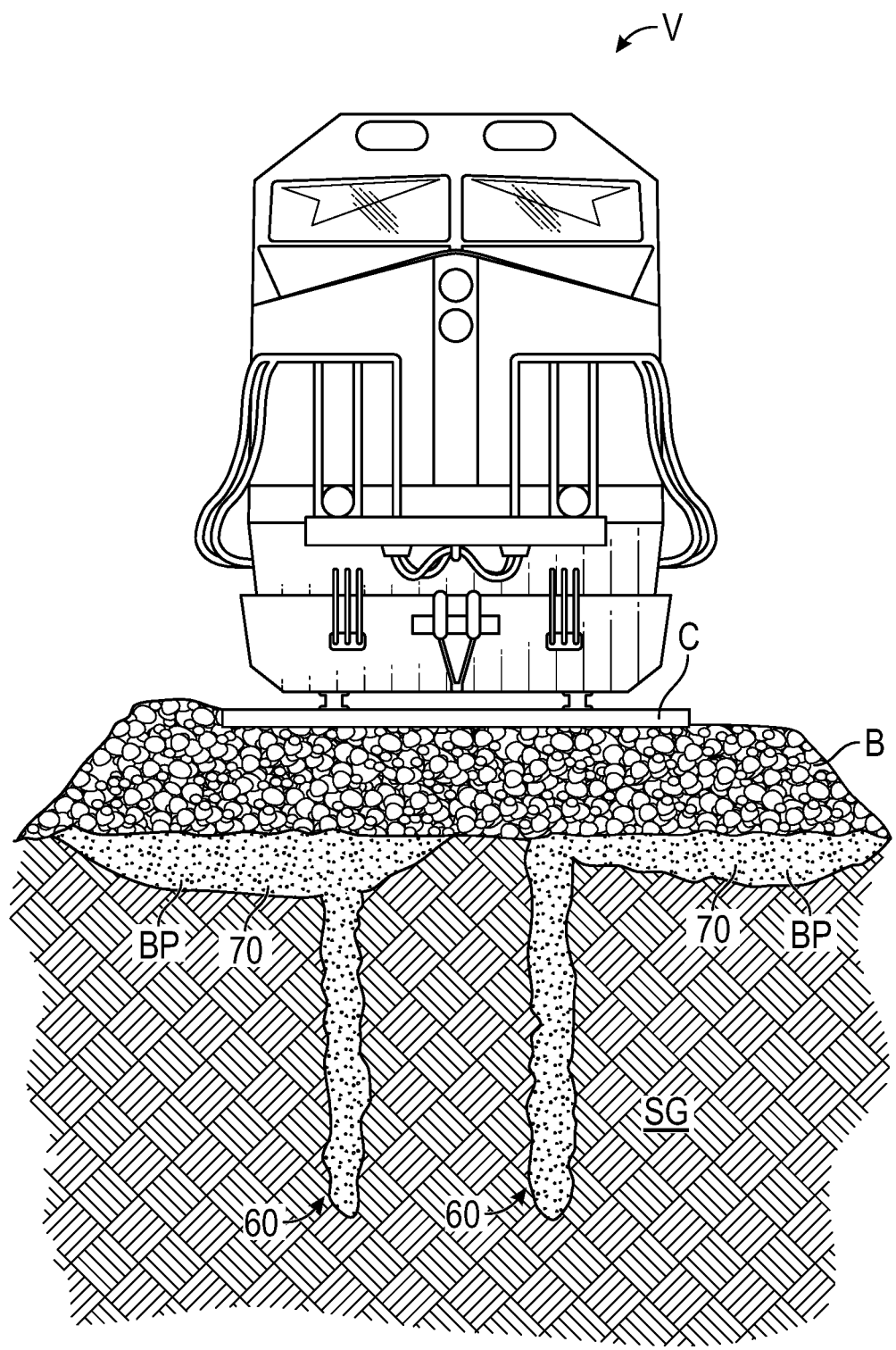
FIG. 12 is a cross-sectional elevation view as shown in FIG. 11 in which the failed ballast layer is repaired by two rows of ground inclusions and ballast fills to fill corresponding ballast pockets underlying the ballast layer

FIG. 12 is a cross-sectional elevation view as shown in FIG. 11 in which the failed ballast layer B is repaired by two rows of ground inclusions 60 and two distinct ballast fills 70 underlying the ballast layer B.

Figure 13:
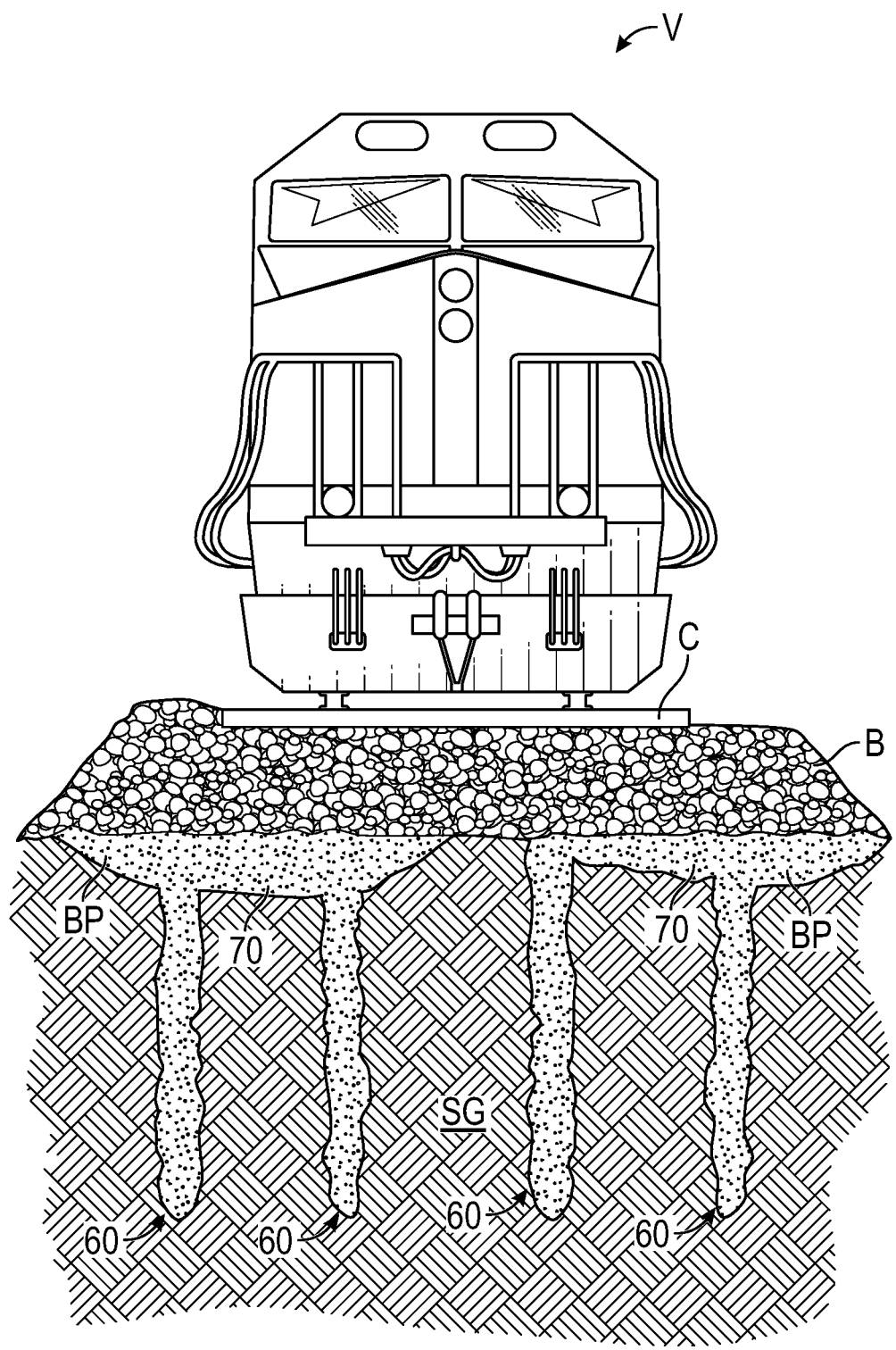
FIG. 13 is another cross-sectional elevation view as shown in FIG. 11 in which the failed ballast layer is repaired by four rows of ground inclusions and ballast fills to fill corresponding ballast pockets underlying the ballast layer.

FIG. 13 is another cross-sectional elevation view as shown in FIG. 11 in which the failed ballast layer B is repaired by four rows of ground inclusions 60 and two distinct ballast fills 70 underlying the ballast layer B.

FIGS. 11-13 represent only a few examples of inclusion configuration or arrays. It should be understood that each inclusion 60 may be selectively emplaced with a pre-selected depth and circumference. While one uniform size for the drill heads 46 are shown, the drill mast assembly 30 may be fitted with drill heads of varying diameters capable of drilling holes to different corresponding diameters.

Figure 14:
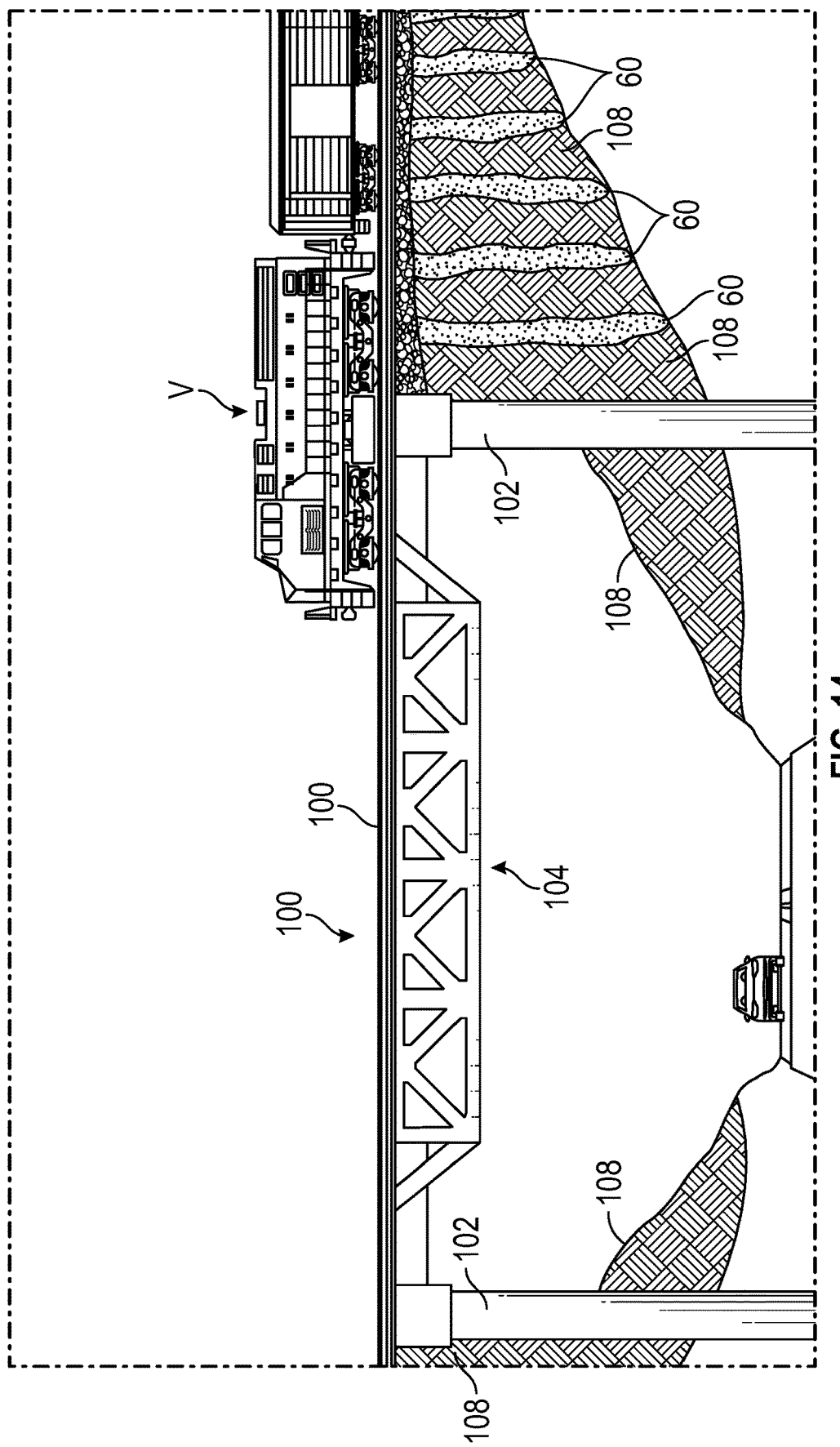
FIG. 14 is a partial cross-sectional side elevation view of a railroad bridge abutment that incorporates ground inclusions.

FIG. 14 is a side elevation and partial cross-sectional view of a railroad bridge abutment that incorporates ground inclusions. More specifically, FIG. 14 shows an exemplary rail bridge construction 100 with abutment walls 102 and a bridge span supported by a truss assembly 104. A rail line 106 traverses the bridge span in which the adjacent bridge abutments may require additional support. The abutment in FIG. 14 is intended to illustrate one which has been constructed with backfill material that is bounded on one side by an abutment wall 102 and the abutment backfill tapers to a decreasing depth as the abutment extends away from the bridge span. The abutment may include wing walls (not shown) or other lateral containing features for the backfill material making up the abutment. FIG. 14 further shows one of the abutments in cross-section with an array of inclusions 60 installed to repair subsurface defects in the bridge abutment. As shown, the inclusions 60 increase in depth as the inclusions approach one end of the bridge span. The inclusions 60 stiffen the abutment to reduce dynamic loading on the bridge itself. The inclusions 60 also reduce the inherent stiffness differential between the rail track embankment and the bridge structure which therefore reduces bridge vibration and displacement under live loading conditions. Stiffening of the bridge abutment may therefore contribute to an extended service life for both the bridge and the abutment.

Figure 15:
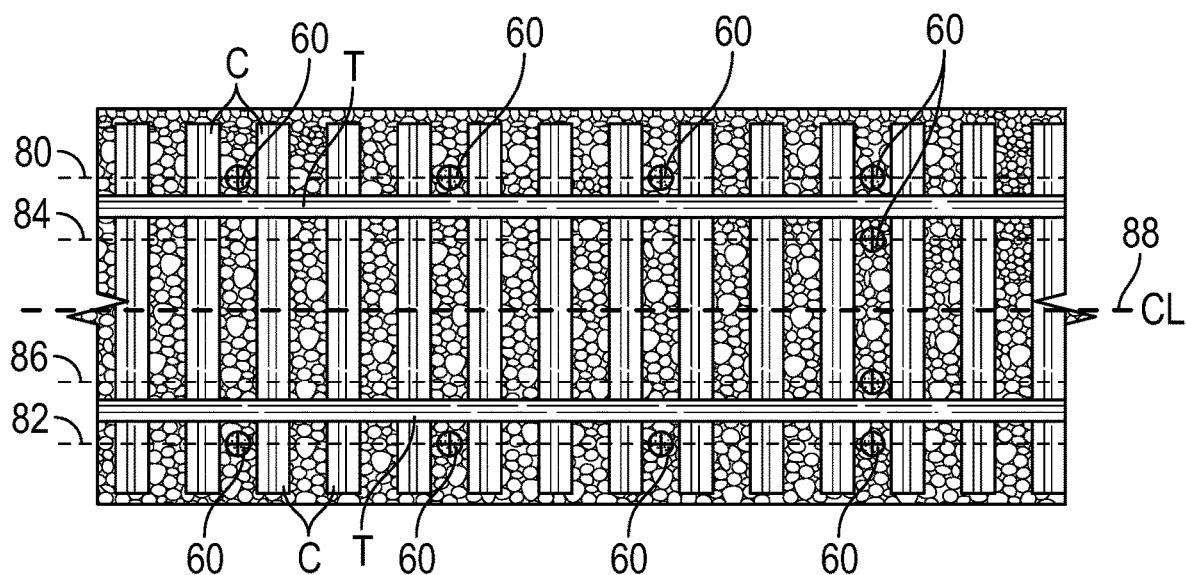
FIG. 15 is a plan view showing one particular configuration or array of emplaced inclusions, more specifically, two rows of inclusions and one pair of inner adjacent inclusions.

FIG. 15 is a plan view showing one particular configuration or array of emplaced inclusions, The rail bed area illustrated is designated with a centerline (CL) 88 and four areas that define locations on both lateral sides of the center line 88. A first area may be defined as extending along line 80 that lies on one exterior lateral side of a track T; a second area may be defined as an area extending along line 82 that lies on the opposing exterior lateral side of the other track T, a third area may be defined as an area extending along line 84 that lies on one interior lateral side of a track T; and a fourth area may be defined as an area extending along line 86 that lies on the opposing interior lateral side of the other track T. The particular configuration or array of inclusions illustrated in FIG. 15 is one row of inclusions centered on line 80, another row of inclusions centered on line 82, one inclusion centered on line 84, and one inclusion centered on line 86. The inclusions on lines 80 and 82 are spaced along every third cross tie C.

Figure 16:
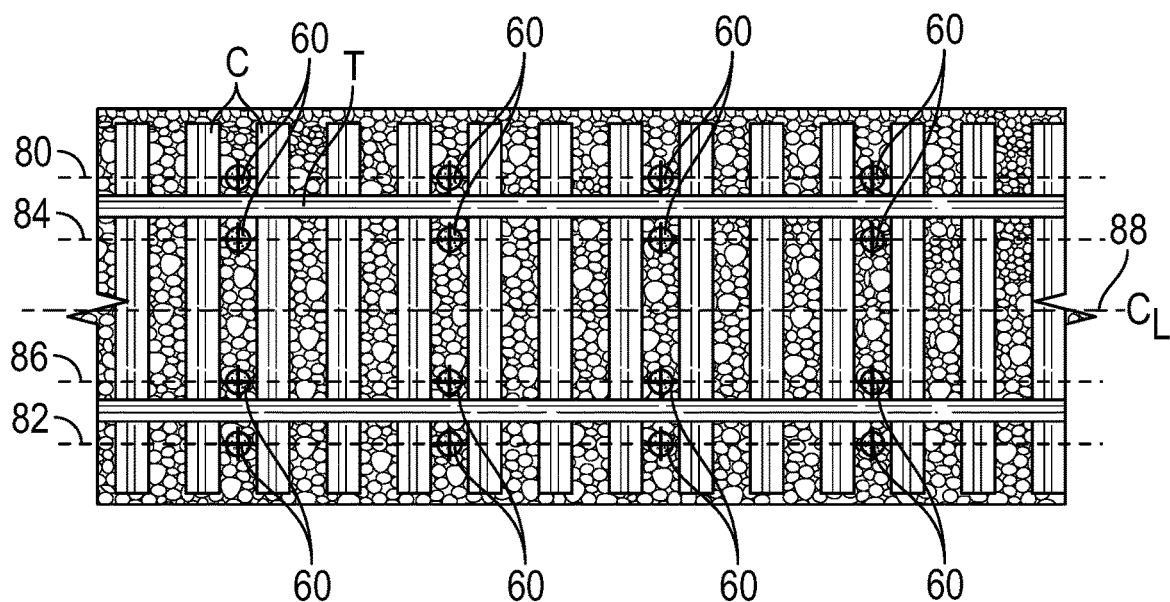
FIG. 16 is a plan view showing another configuration or array of emplaced inclusions, more specifically, four rows of inclusions located between every third cross tie.

FIG. 16 is a plan view showing another configuration or array of emplaced inclusions. More specifically, this figure shows four rows of inclusions along lines 80, 82, 84, and 86 in which each inclusion is located in a gap between every second cross tie C. Each of the four rows is laterally aligned such that there are four inclusions 60 across a lateral line that can be drawn between the four inclusions.

Figure 17:
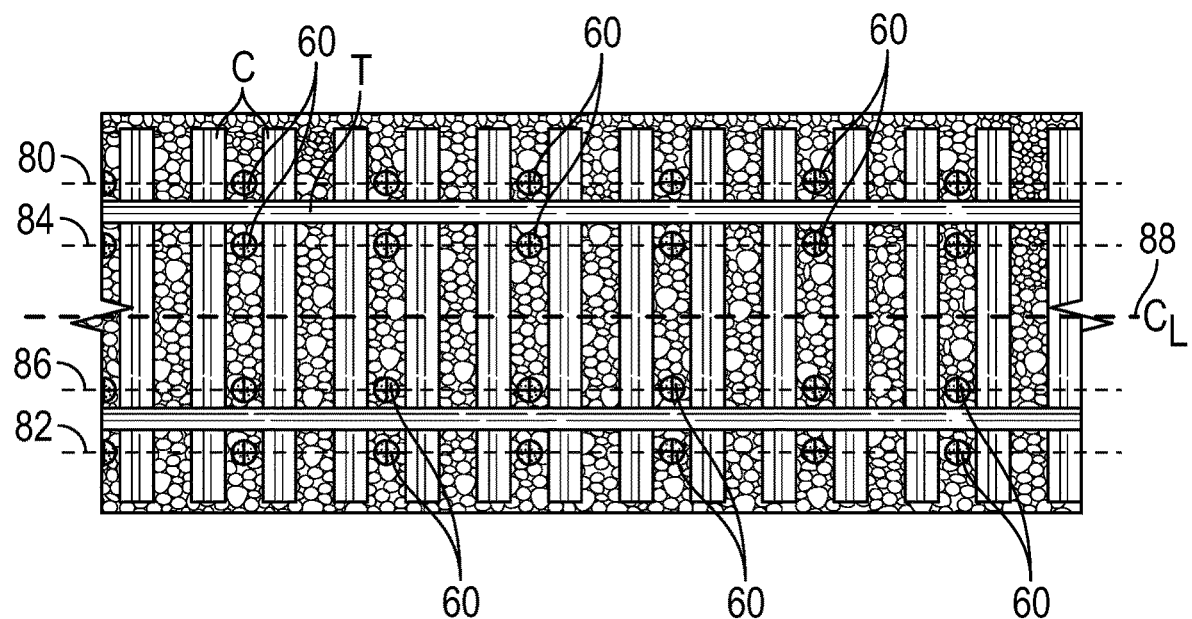
FIG. 17 is a plan view showing another configuration or array of emplaced inclusions, more specifically, four rows of inclusions located between every other cross tie.

FIG. 17 is a plan view showing yet another configuration or array of emplaced inclusions. More specifically, this figure shows four rows of inclusions along lines 80, 82, 84, and 86 in which each inclusion is located in gap between very other cross tie. Each of the four rows is laterally aligned such that there are four inclusions 60 across a drawn lateral line.

Figure 18:
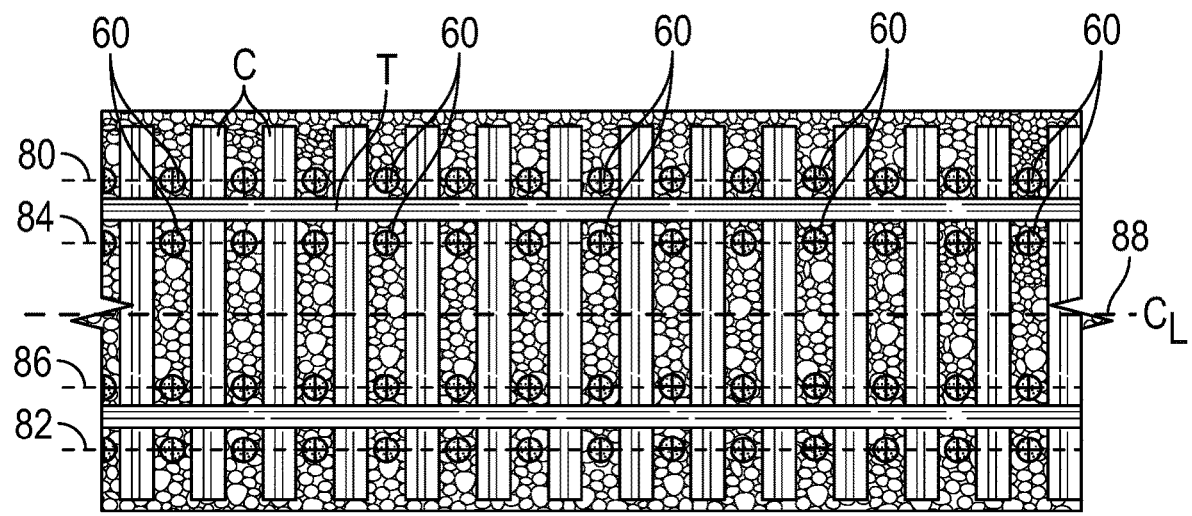
FIG. 18 is a plan view showing another configuration or array of emplaced inclusions, more specifically, four rows of inclusions located between each cross tie.

FIG. 18 is a plan view showing yet another configuration or array of emplaced inclusions. More specifically, this figure shows four rows of inclusions along lines 80, 82, 84, and 86 in which each inclusion is located in a gap between each adjacent cross ties. Each of the four rows is laterally aligned such that there are four inclusions 60 across a drawn lateral line.

The array of inclusions in FIGS. 15-18 is exemplary and other patterns of inclusions 60 can be employed within an array. As mentioned, each array may have inclusions placed at different depths and each inclusion can be a different effective diameter. The illustrated arrays are shown as being symmetrical with regard to longitudinal and lateral spacing of the inclusions; however, an array can also be non-symmetrical by the concentration of one or more inclusions at an area that may require greater repair and support.

According to one of the methods of the invention, it includes the method for determining a design for stabilizing a rail bed comprising: identifying a rail bed with one or more failed subsurface areas; determining an area of the failed areas; determining a depth of the failed areas under a surface of the rail bed; calculating a required bearing capacity of the rail bed; determining a differential between an actual bearing capacity considering the failed subsurface areas and the required bearing capacity; determining an optimum subgrade stiffness modulus;

calculating a number of subsurface inclusions required to stabilize the rail bed including a spacing between the subsurface inclusions, depths of emplacement, and sizes of the inclusions; automatically generating a design layout with depicted subsurface inclusions and spacing. This method may further include stabilizing the rail bed by emplacement of inclusions according to the design layout by rail mounted equipment including a high rail mounted drilling rig. The design layout produced may be facilitated by a computer processor and associated programmable instructions in which basic input parameters are entered and a visual display is provided for the design layout. For example, input parameters may include the measured failed areas and the existing and required bearing capacity. The optimum or target subgrade stiffness modulus may be determined as another input parameter. The design layout is generated with one or more options as to the number, spacing, and size of inclusions that satisfy design parameters including the required bearing capacity and subgrade stiffness modulus. Soil conditions may also serve as another input parameter. The programmable instructions are able to access a database with a number of design layouts with predetermined effects as to how a particular design layout may contribute to adequately stabilizing the rail bed. In other words, the database may comprise a number of proposed design layouts that achieve adequate bearing capacity and subgrade stiffness considering the type of soil present and an identification of the size and location of failed subsurface areas. By providing a pre-existing suite of design options, the method of determining a design for use in the field is simplified in an automated context.

There are many advantages to the system and methods of the invention. The integrated system that is rail mounted with a drilling capability provides an economical and efficient way to significantly improve the stability of failing subgrade and subsoil conditions. Maintenance costs are reduced over time because emplaced inclusions and ballast fills provide long-term soil stabilization. The minimally invasive repairs that can be conducted do not require any separate stabilization efforts with respect to the subgrade/subsoil and the ballast layers. Resurfacing of the most upper ballast layer may be required, but this is a relatively low-cost task with minimal effort required.

Because of the rail mounted equipment that does not require offloading or any equipment to be positioned on the ground adjacent to the railroad, the system and method is also advantageous within environmentally sensitive areas in which expensive and protracted permit processes can be avoided. In most circumstances, a railroad has an easement or right-of-way across land, but the railroad does not own the land around or on the rail bed. Therefore, permits may normally be required to access environmentally sensitive lands where equipment can be offloaded and operated. The rail mounted equipment of the system completely eliminates off-rail traffic at a job site.

The invention claimed is:

1. A system for repairing a rail bed underlying a railroad having rails and cross ties, the system comprising:
    a rail mounted motor vehicle;
    a drill mast assembly mounted on the motor vehicle, the drill mast assembly having a drill mast frame that supports at least one drill mast;
    a drill mounted on said at least one drill mast, said drill having a drill head;
    a hydraulic lift secured to said drill mast assembly to raise and lower said drill mast assembly wherein the hydraulic lift rotates the drill mast assembly between a first horizontal stowed position to a second vertical operating position;
    a power source for powering the drill to selectively penetrate the rail bed;
    a pump;
    a grout source wherein the pump operates to transfer the grout through a transfer line to the drill mast assembly; and
    wherein the drill head is lowered to drill holes in the rail bed while the drill mast assembly is in the second vertical operating position and to inject the grout into the rail bed; and
    wherein the motor vehicle has wheels enabling the motor vehicle to be driven off and driven onto the rails.

2. The system, as claimed in claim 1, further comprising: a cement silo for storing grout material; and a transfer line connected between the silo and pump enabling transfer of grout material from the silo to the pump.

3. The system, as claimed in claim 1, further comprising: a rail trailer mounted on the rails.

4. The system, as claimed in claim 3, further comprising: an engine mounted on the rail trailer; and drive tracks mounted on the rail tracks and communicating with the engine to propel the trailer.

5. The system, as claimed in claim 1, wherein: the drill mast assembly is secured to the motor vehicle by a support frame.

6. The system, as claimed in claim 1, wherein: the motor vehicle has rail guides removably secured to the motor vehicle to maintain alignment of the wheels on the rail track.

7. The system, as claimed in claim 1, wherein: the drill head is selectively and controllably lowered to drill holes in the rail bed and is subsequently lifted to inject grout to form inclusions in the drilled holes.

8. The system, as claimed in claim 7, wherein: the motor vehicle is operated to incrementally advanced to position the drill to emplace a plurality of inclusions that are spaced from one another along a length of the rail bed.

9. A method for stabilizing subgrade and subsoil ground layers of a railroad bed underlying a railroad having rails and cross ties, the method comprising:
providing a rail mounted vehicle, a drill mast mounted on the vehicle, the drill mast having a drill mast frame that supports the drill mast, the drill mast frame configured to support a pair of drills and corresponding drill heads;
determining a location on the railroad where the subgrade or subsoil have failed causing destabilization of the ballast upon which the rails and cross ties lie;
rotating the drill mast including the drill mast frame and the drill mast from a first stowed position to a second vertical operating position for drilling;
positioning the drills over the location to a first position;
drilling first holes by the drills into the subgrade and/or the subsoil; and
withdrawing the drills and injecting a grout mix by the drill heads as the drills are withdrawn to form corresponding first inclusions in the first drilled holes.

10. The method, as claimed in claim 9, further comprising: injecting the grout mix in a ballast pocket to fill the ballast pocket forming ballast fill that communicates with at least one inclusion.

11. The method, as claimed in claim 9, further comprising: varying a rate of injection of the grout mix through the drills to selectively form the inclusions considering a volume of the drilled holes.

12. The method, as claimed in claim 9, further comprising: determining a scope of the failed subgrade and/or subsoil; determining a number of inclusions required to repair the subgrade and/or subsoil; predetermining an array of inclusions to emplace considering the number of inclusions required; and sequentially emplacing the array of inclusions including a plurality of the inclusions that are spaced along a length of the railroad and spaced laterally from one another.

* * * * *